United States Patent
McNew et al.

(10) Patent No.: US 8,509,764 B2
(45) Date of Patent: Aug. 13, 2013

(54) METHOD AND SYSTEM FOR BROADCAST MESSAGE RATE ADAPTATION IN MOBILE SYSTEMS

(75) Inventors: Justin Paul McNew, Del Mar, CA (US); John Thomas Moring, Encinitas, CA (US); Khaled I. Dessouky, Studio City, CA (US)

(73) Assignee: Kapsch TrafficCom AG, Vienna (AT)

( * ) Notice: Subject to any disclaimer, the term of this patent is extended or adjusted under 35 U.S.C. 154(b) by 1102 days.

(21) Appl. No.: 11/859,978

(22) Filed: Sep. 24, 2007

(65) Prior Publication Data

US 2009/0081958 A1   Mar. 26, 2009

(51) Int. Cl.
*H04W 4/00* (2009.01)

(52) U.S. Cl.
USPC .................................. 455/431; 455/432.3

(58) Field of Classification Search
USPC ........... 455/450–453, 445–447, 414.1, 414.3, 455/132, 149, 500, 507, 521, 452.2, 2.01, 455/3.01–3.03, 412.2; 340/1.1–16.1; 333/1–137
See application file for complete search history.

(56) References Cited

U.S. PATENT DOCUMENTS

| | | | |
|---|---|---|---|
| 6,765,495 B1 * | 7/2004 | Dunning et al. | 340/903 |
| 7,800,514 B2 * | 9/2010 | Lyle et al. | 340/905 |
| 2004/0073361 A1 | 4/2004 | Tzamaloukas et al. | |
| 2005/0237934 A1 * | 10/2005 | Mito et al. | 370/232 |
| 2006/0262750 A1 * | 11/2006 | Walton et al. | 370/329 |
| 2007/0146162 A1 * | 6/2007 | Tengler et al. | 340/905 |
| 2008/0137680 A1 * | 6/2008 | Santhanam | 370/431 |
| 2009/0016285 A1 | 1/2009 | Li et al. | |

FOREIGN PATENT DOCUMENTS

| | | | |
|---|---|---|---|
| EP | 1011288 A1 * | 6/2000 | |
| WO | WO 2006/008722 A1 | 1/2006 | |
| WO | WO 2006/011109 A1 | 2/2006 | |
| WO | WO 2010/011796 A2 | 1/2010 | |

OTHER PUBLICATIONS

Extended European Search Report for corresponding European Patent Application No. 11450076.2, dated Sep. 28, 2011, citing the references listed above, 8 pp.

* cited by examiner

*Primary Examiner* — Olumide T Ajibade Akonai
*Assistant Examiner* — Emem Stephen
(74) *Attorney, Agent, or Firm* — Christie, Parker & Hale, LLP (57) ABSTRACT

A method and system for setting transmission rate of messages transmitted and received by a mobile unit. The method and system include monitoring the speed of the mobile unit; and adjusting the transmission rate based on the speed of the mobile unit. Prevailing conditions may also be determined and the transmission rate may be further adjusted based on the prevailing conditions. The prevailing conditions may be determined based on at least one of states of one or more sensors local to the mobile unit and information provided from an external source over a communication system. The prevailing conditions may include at least one of slick pavement, limited visibility, road construction, object in roadway, accident, dense traffic, and anomalous driving behavior.

21 Claims, 6 Drawing Sheets

METHOD AND SYSTEM FOR BROADCAST MESSAGE RATE ADAPTATION IN MOBILE SYSTEMS

FIELD OF THE INVENTION

The present invention relates generally to the field of mobile wireless communication systems, particularly those employing messages repeatedly transmitted by the mobile units. The present invention provides a method for adapting the frequency of transmission of certain message broadcasts based on the prevailing conditions.

BACKGROUND

According to the US National Highway Traffic Safety Administration, traffic crashes were the leading cause of death for the age group 4 through 34 in 2003. It is known that traffic fatalities increase dramatically with an increase in vehicle speed. Work in the area of Intelligent Transportation Systems envisions a wireless communications infrastructure encompassing both fixed roadside units and mobile vehicular units mounted in commercial and private motor vehicles. One application of such a system is to share real-time safety information among vehicles in a local area. For example, a basic safety message that is intended to be broadcast repeatedly to surrounding vehicles contains data elements such as, position, motion, control, and vehicle size.

These messages and others are transmitted on a wireless channel with limited capacity. If more messages are being generated than can be accommodated by the communications channel, messages will be delayed and possibly lost, negatively affecting the safety of the vehicles and their occupants.

Given the limited spatial range of such wireless systems in a nominal highway situation, a vehicle may be in range of a dozen or so other vehicles at a time. Safety messages broadcast at one message per second per vehicle would impose a light load on the communications channel. If the traffic slows to a "bumper-to-bumper" density, however, there may be hundreds of vehicles within range. In this scenario, the message volume may overwhelm the communications system, reducing its ability to serve its purpose of providing timely delivery of critical information. Since the critical information (e.g., location) associated with a slower moving vehicle is less dynamic than that of a fast-moving vehicle, it is not necessary to update the slower vehicles' information as frequently. Likewise, under otherwise benign conditions, reporting rate can be lessened. Conversely, under adverse conditions, such as precipitation or road damage, traffic safety will benefit from more frequent updates.

U.S. Pat. Nos. 6,240,294 and 6,600,927 address periodic position reports transmitted by mobile military vehicles. They describe two reporting modes: a periodic (PER) mode where position updates are sent at a fixed interval (e.g., every two minutes), and a movement (MOV) mode where position updates are issued when the unit has moved a pre-defined distance (e.g., 300 meters) from the location of its last report. The system described in U.S. Pat. No. 6,600,927 also adjusts the time and distance thresholds based on a measurement of network loading, which is defined as a function of channel idle time. The primary objective of this system is to track the coarse location of the reporting military units.

Figure 6:
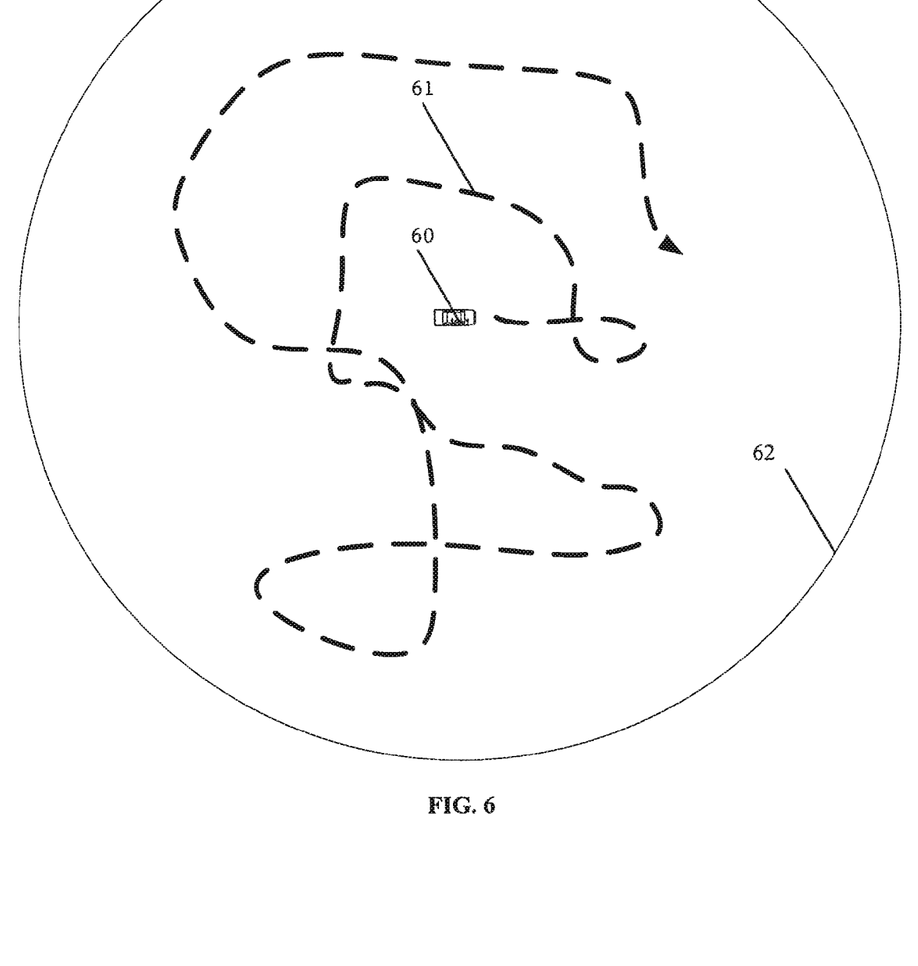
FIG. 6 shows the movement course of a mobile device according to the prior art.

FIG. 6 shows a vehicle 60, in a MOV mode that sends a first position report. It then moves over an extensive and complex course 61. However, the vehicle 60 does not send a position update as long as it does not move more than a predefined distance from its previously reported position and thus its net movement never exceeds the distance criterion (indicated by radius 62), so it never sends a subsequent update.

Therefore, there is a need for an intelligent vehicle that is capable of broadcasting repeated safety messages at a high albeit variable, environment dependent rate, so that nearby vehicles can quickly adapt to its presence and its movements. The receipt of a timely safety message potentially allows the recipient to avoid collision with the reporting vehicle, for example, by moving out of its path.

SUMMARY

The present invention provides a method for adapting the frequency of transmission of certain message broadcasts based on the prevailing conditions. The present invention reduces the communication channel loading in a benign scenario by reducing the message transmission rate, while serving the safety objectives of the reporting system by increasing the message rate during high-risk situations.

In some embodiments, the present invention is a method and system for setting transmission rate of messages transmitted and received by a mobile unit. The method and system include monitoring speed of the mobile unit; and adjusting the transmission rate based on the speed of the mobile unit.

Prevailing conditions may also be determined and the transmission rate may further be adjusted based on the prevailing conditions. The prevailing conditions may be determined based on at least one of state of one or more sensors local to the mobile unit and information provided from an external source over a communication system. The prevailing conditions may include at least one of slick pavement, limited visibility, road construction, object in roadway, accident, dense traffic, and anomalous driving behavior.

DETAILED DESCRIPTION

In some embodiments, the present invention uses safety criteria including vehicle (mobile unit) speed to regulate message transmission (reporting) rate. A higher reporting rate from a fast-moving vehicle will provide receiving vehicles more timely and therefore more accurate assessments of the reporting vehicle's current state, and increase the likelihood of avoiding a collision.

In some embodiments, the present invention considers the prevailing driving conditions, increasing the reporting rates when conditions are adverse. According to US Department of Transportation data, over 20% of vehicle crashes and crash-related injuries occur under adverse road or weather conditions. Therefore, more frequent safety message updates also benefit the recipients under adverse road or weather conditions, for example, when visibility is poor, road surface is wet, etc.

In some embodiments, the present invention includes additional attributes such as, different ways to determine communications loading, and the use of predefined maximum and minimum reporting rates.

Yet, in some embodiments, the present invention uses a combination of these criteria to regulate and determine the appropriate message transmission rates.

Figure 1:
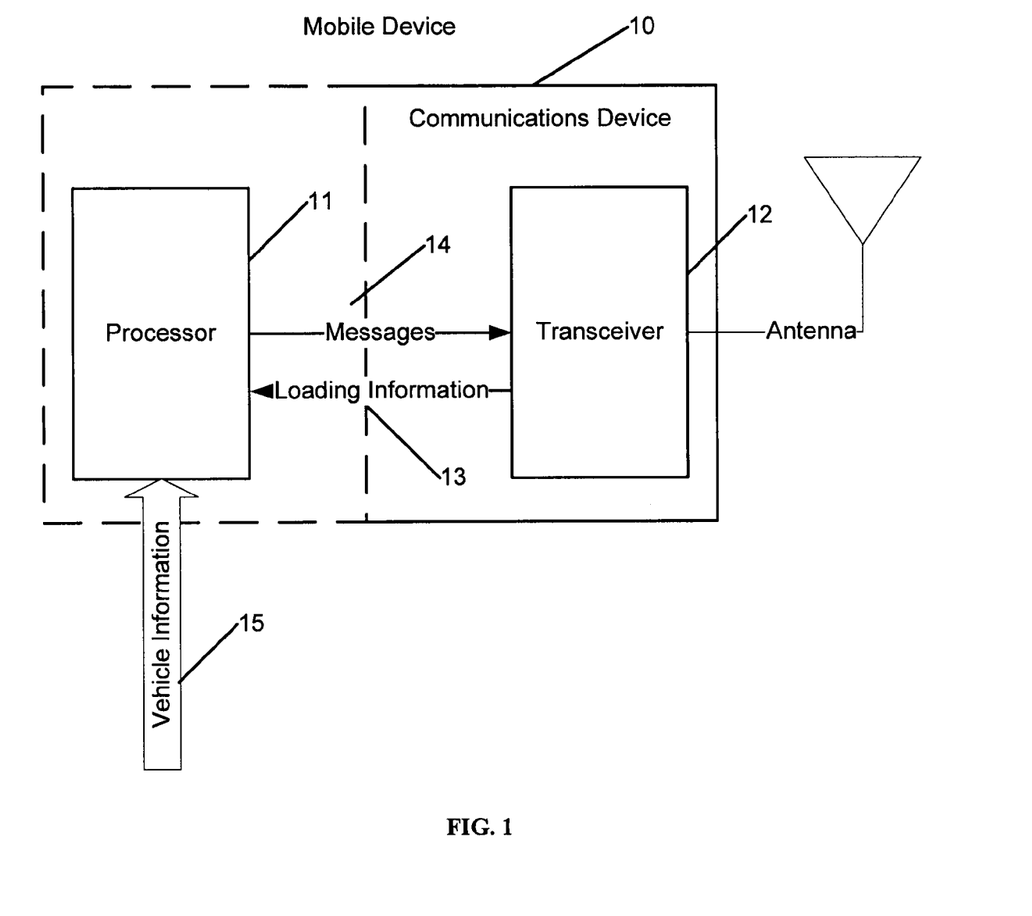
FIG. 1 shows an exemplary block diagram of a mobile device, according to some embodiments of the present invention.

FIG. 1 shows an exemplary block diagram of a mobile device included with a mobile unit, according to some embodiments of the present invention. The mobile device 10 includes a radio transceiver 12 that provides access to the wireless communication channel as well as implementing the appropriate protocols to allow interaction with other like devices. The device also includes a processor module 11, which may include associated memory and may operate within the transceiver component or in a separate physical housing. The processor module 11 collects vehicle information 15 reflecting current vehicle speed and other information, and creates messages 14 for delivery to the transceiver for subsequent broadcast on the wireless medium. The processor module 11 further adjusts the message transmission rate based on the speed of the vehicle (mobile unit). The processor 11 adjusts the transmission rate by controlling how often it passes messages 14 to the transceiver 12 for transmission on the wireless medium. In some embodiments, the transceiver provides communications channel loading information 13 to the processor, reflecting the current utilization of the communication channel.

Figure 2:
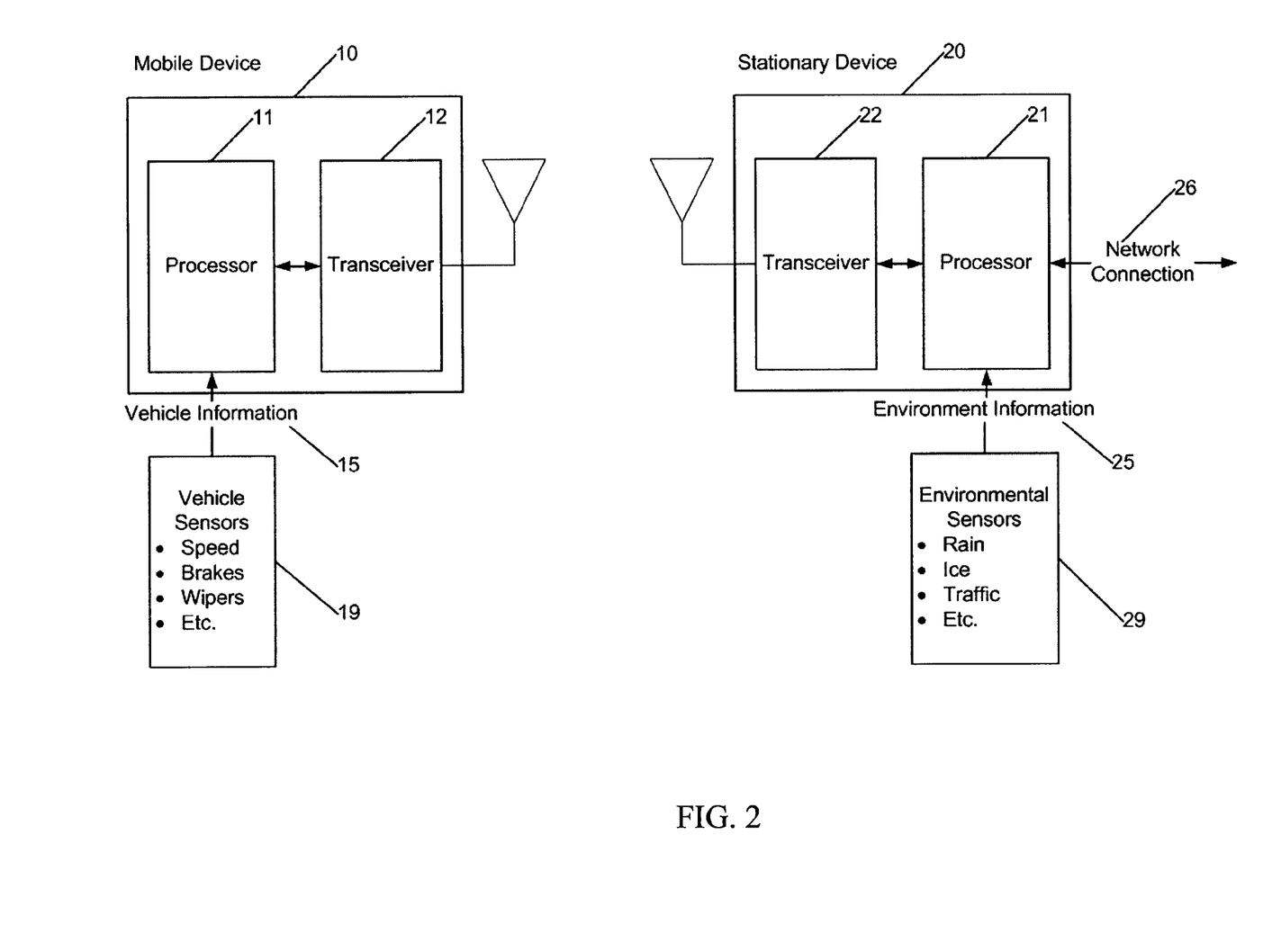
FIG. 2 illustrates an exemplary block diagram of a system incorporating a mobile message reporting device and a stationary message processing device, according to some embodiments of the present invention.

FIG. 2 illustrates an exemplary block diagram of a system incorporating a mobile message reporting device and a stationary message processing device, according to some embodiments of the present invention. Vehicle sensors 19 provide vehicle information 15 collected from the vehicle (e.g., speed, windshield wiper status). The mobile device (and other similar devices not shown) generate and deliver messages to a stationary device 20 over the wireless medium. The stationary device includes a transceiver 22. It also includes a processor 21 that accepts the reports from the mobile devices. Similarly, the messages may be received and processed by other mobile devices.

The message processor module 21 may also collect environmental information 25 from environmental sensors, including such information as traffic speed or density, or road surface conditions. In some embodiments, the message processor module 21 broadcasts environmental information to the mobile devices for use in their message rate determination calculations. In an alternate embodiment, the message processor module 21 calculates the message rate and broadcasts the rate to be used by the reporting mobile devices.

An embodiment of the stationary device also includes a network connection 26, which provides additional information that may not be available to local sensors, such as road construction or lane closures. This information is used similarly to the environmental information in adjusting the mobile message transmission rate.

Figure 3:
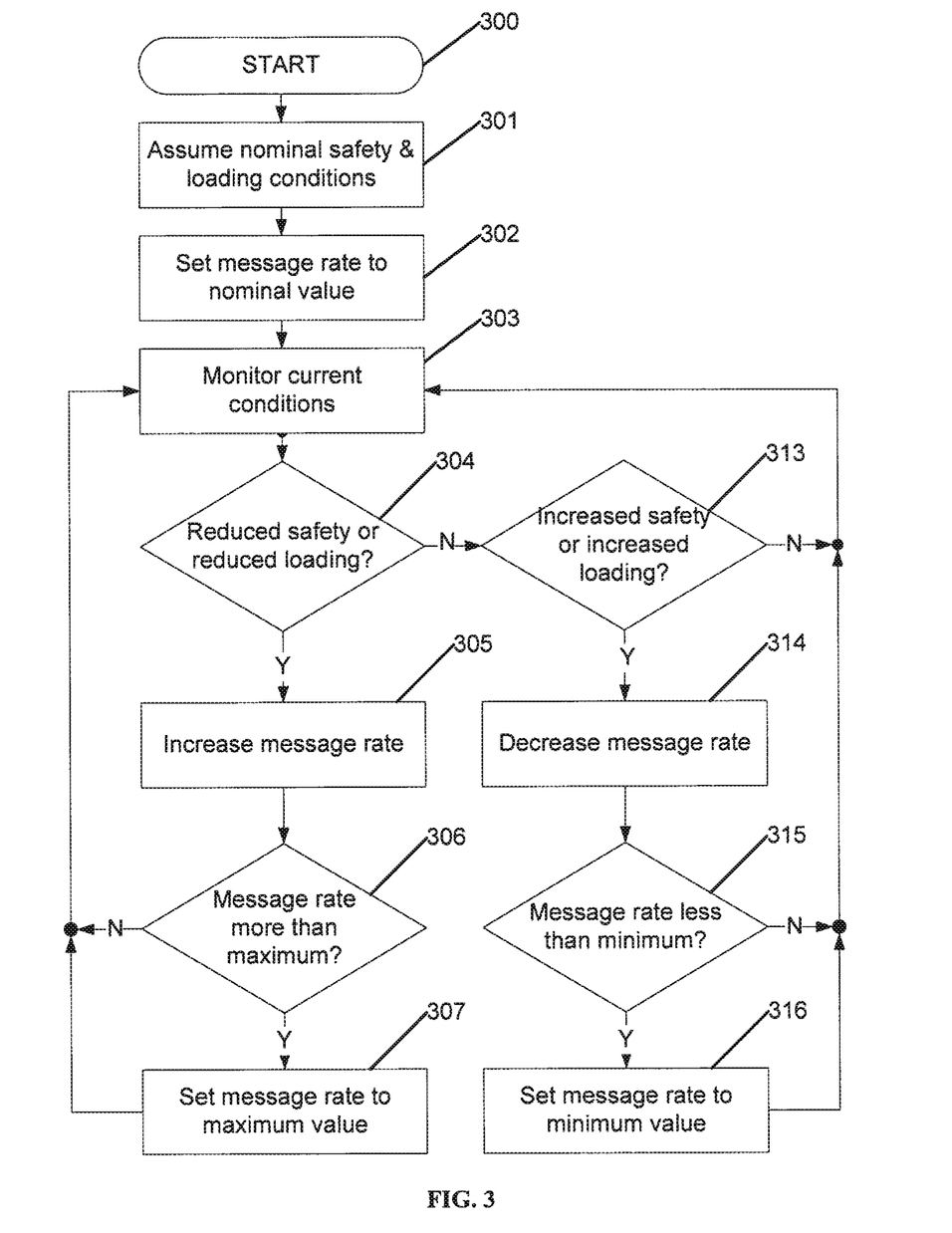
FIG. 3 illustrates an exemplary process flow for message determination, according to some embodiments of the present invention.

FIG. 3 illustrates an exemplary process flow for message determination, according to some embodiments of the present invention. In block 300, the process initializes its safety metrics/conditions (e.g., vehicle speed, road conditions). In block 301, channel loading metric are set to nominal values. In block 302, the message rate is set accordingly to a nominal default value. The safety metrics/conditions and/or the message rate maybe pre-set or programmed in the system, or transmitted to the system as its initial conditions.

In block 303 the process then monitors the current safety and channel characteristics. If the monitored safety factors are reduced from the nominal or previous values (indicating a higher potential for collision) and/or channel loading is reduced (indicating opportunity for more frequent updates) (block 304), the message transmission rate is provisionally increased in block 305. However, if the message transmission rate increase exceeds a maximum predefined ceiling in block 306, the message rate is set to the maximum allowed value, in block 307. If on the other hand, safety factors increase (indicating less risk of collision) and/or channel loading increases (indicating potential for a communications bottleneck) (block 313), the message rate is provisionally reduced in block 314. The decreased rate is compared to a predefined floor value in block 315, and prevented from falling below the minimum allowed value in block 316.

In one embodiment, the message rate is proportional to the vehicle (mobile unit) speed. For example, an equation similar to the following may be used to determine the rate.

$$R = \mathrm{MIN}(\mathrm{MAX}(R_{min}, V/a), R_{max}) \qquad \text{(Eq. 1)}$$

Where,

R is the message rate

Figure 4:
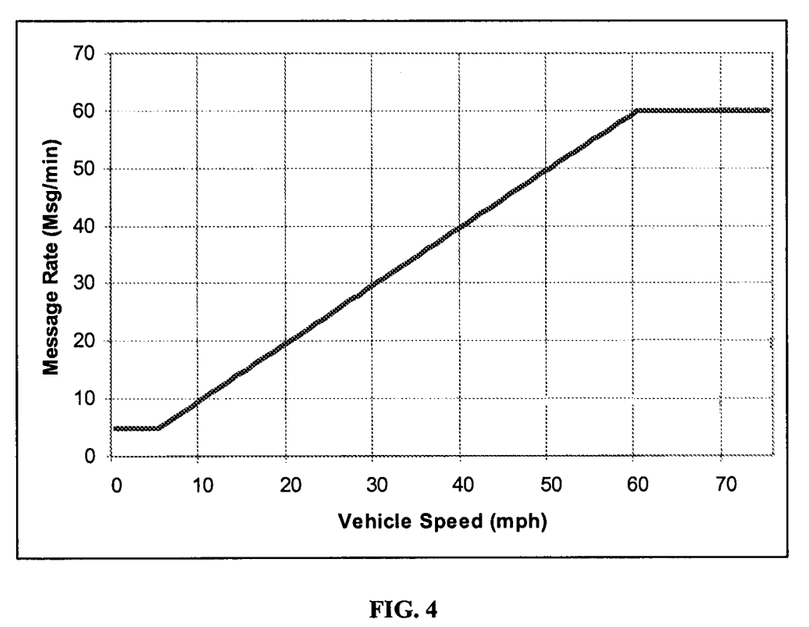
FIG. 4 shows results of an exemplary message rate calculation based on a vehicle speed, according to some embodiments of the present invention.

V is the vehicle speed a is a scaling factor $R_{min}$ is the minimum allowed value of R $R_{max}$ is the maximum allowed value of R MIN(x, y) chooses the minimum of x and y MAX(x, y) chooses the maximum of x and y As an example, FIG. 4 shows the message rate for a range of vehicle speeds, when:

R is in messages per minute

V is in miles per hour a=1 mile-minute/message-hour $R_{min}$=5 messages per minute $R_{max}$=60 messages per minute In some embodiments of the invention, the message generator also takes into account the total loading of the communications channel. A highly loaded channel causes devices to scale back their transmissions, while a lightly loaded channel allows more frequent transmissions. There are a number of known methods for characterizing channel loading, including number of transmission collisions, number of transmissions received per time interval, proportion of time that the channel is idle (or conversely, busy), the average radio energy received over a given time interval, and others. Any of these known methods may be suitable for use by the message rate adaptation.

Figure 5:
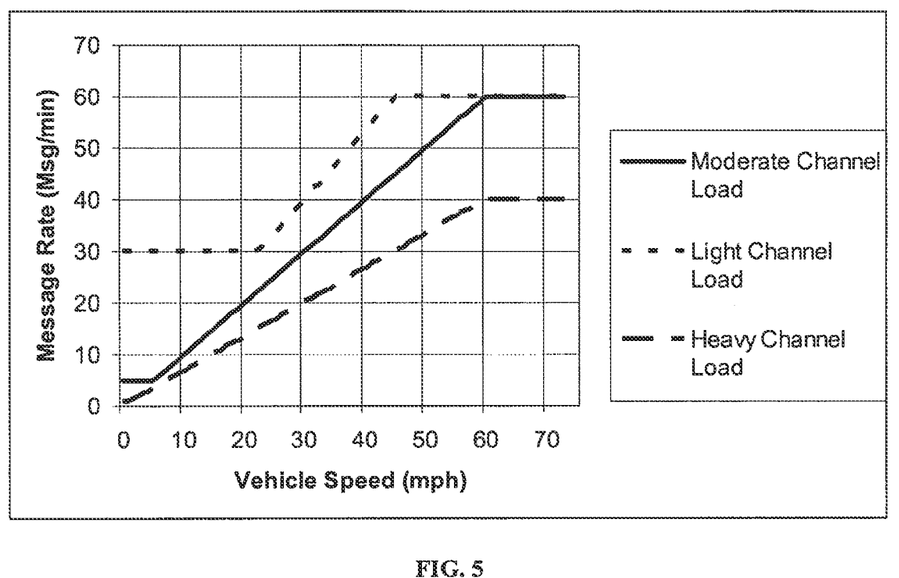
FIG. 5 shows results of an exemplary message rate calculation based on a vehicle speed and channel loading, according to some embodiments of the present invention.

As an example, three different parameter sets are chosen to accompany the message rate calculation (see, Eq. 1, above). A first set is used when the channels is lightly loaded (e.g., less than 30% channel busy). A second set is used when the channel is moderately loaded (e.g., from 30% to 70%), and a third set is used when the channel is heavily loaded (e.g., greater than 70%). Exemplary parameters are shown in Table I below, where the "moderate load" parameters equal those in the previous example.

TABLE I

|  | Light Load | Moderate Load | Heavy Load |
| --- | --- | --- | --- |
| a | 0.75 | 1 | 1.5 |
| $R_{min}$ | 30 | 5 | 1 |
| $R_{max}$ | 60 | 60 | 40 |

In some embodiments, at least one of the parameters "a", Rmin and Rmax, is calculated as a function of the communication loading, rather than taking a predefined value.

In some embodiments, the message rate calculation takes into account the prevailing (environmental) conditions. Under adverse (environmental) conditions, the reporting rate tends to be faster. Prevailing conditions may include precipitation, reduced visibility, road hazards, etc. The prevailing conditions may further include slick pavement, limited visibility, road construction, object in roadway, accident, dense traffic, and anomalous driving behavior.

These conditions may be recognized locally at the mobile device, for example by monitoring the state of the windshield wipers, defroster, and headlights, or by recognizing frequent "braking" signals from nearby traffic. In one embodiment, the mobile device interfaces to the vehicle (black box) computer to access vehicle sensors and conditions. Adverse conditions may also be determined centrally and broadcast to the mobile units.

Some prevailing conditions include those in Table II below, along with examples of methods that may be used to detect the condition.

TABLE II

| Condition | Example | Vehicle-based Detection | Infrastructure-Based Detection |
| --- | --- | --- | --- |
| Slick pavement | Wet, icy, snowy/slushy, oil | Anti-lock brake sensor | Weather sensors |
| Limited visibility | Rain, snow, fog, sleet, dust | Headlight/wiper/defroster sensors | Weather sensors |
| Road construction | Lane closure | N/A | Emergency services report |
| Object in roadway | Debris | Radar | Emergency services report |
| Accident/incident | Collision, stalled vehicle | Airbag sensor, reports from other vehicles | Emergency services report |
| Dense traffic | Reduced inter-vehicle spacing for prevailing traffic speed/conditions | Radar | Roadside sensors |
| Anomalous driving behavior | Weaving, wrong-way driving | Acceleration sensor | Roadside sensors, vehicle reports |

In some embodiments, the message rate calculation considers the change in the velocity vector of the vehicle, rather than just its magnitude as described above. Consequently, an accelerating (or decelerating) unit would tend to report at a higher rate than a constant-speed unit. Likewise, a unit experiencing a sudden change in direction would report more frequently than one continuing in a straight line.

The examples above show how vehicle speed, or vehicle speed and channel loading, can be used to select an appropriate message rate. When multiple factors such as the various adverse conditions are incorporated, the same adjustment mechanisms (maximum rate, minimum rate, speed multiplier factor) may be used to select the appropriate message rate. It will be recognized that different adjustment mechanisms could be chosen to produce a comparable effect without changing the nature of the invention.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims.

What is claimed is:

1. A method for setting broadcast rate of messages broadcast and received by a mobile unit, the method comprising:
   broadcasting a message at a message broadcast rate over a wireless communication channel;
   receiving current speed of the mobile unit, from the mobile unit; and
   adjusting the message broadcast rate based on the received current speed of the mobile unit, wherein the message broadcast rate is adjusted such that the message broadcast rate is continuously decreased as the speed of the mobile unit is reduced, and the message broadcast rate is continuously and linearly increased within minimum and maximum range as the speed of the mobile unit is increased.

2. A method for setting transmission rate of messages transmitted and received by a mobile unit, the method comprising:
   transmitting a message at a message transmission rate over a wireless communication channel;
   monitoring speed of the mobile unit; and
   adjusting the message transmission rate based on the speed of the mobile unit, wherein the message transmission rate is adjusted such that the message transmission rate is decreased as the speed of the mobile unit is reduced, and the message transmission rate is increased as the speed of the mobile unit is increased, where the transmission rate R is adjusted based on calculating the following:

$$R = \mathrm{MIN}(\mathrm{MAX}(R_{min}, V/a), R_{max}) \qquad (\text{Eq. 1}),$$

where,

R is the message transmission rate,

V is the speed of the mobile unit, a is a scaling factor, $R_{min}$ is the minimum allowed value of R, and $R_{max}$ is the maximum allowed value of R.

3. The method of claim 1, further comprising
determining prevailing conditions; and
adjusting the broadcast rate based on the prevailing conditions.

4. The method of claim 3, wherein the prevailing conditions are determined based on at least one of states of one or more sensors local to the mobile unit and information provided from an external source over a communication system.

5. The method of claim 3, wherein the prevailing conditions include at least one of slick pavement, limited visibility, road construction, object in roadway, accident, dense traffic, and anomalous driving behavior.

6. The method of claim 1, wherein the broadcast rate is further lowered when transmission channel loading is heavy and the broadcast rate is increased when the transmission channel loading is light.

7. The method of claim 6, further comprising determining the transmission channel loading based on number of messages received in a given time interval.

8. The method of claim 6, further comprising determining the transmission channel loading based on average radio energy received in a given time interval.

9. The method of claim 6, further comprising determining the transmission channel loading based on the number of transmission collisions detected in the transmission channel in a given time interval.

10. The method of claim 5, further comprising determining the transmission channel loading based on the proportion of time the transmission channel is in a busy or idle state in a given time interval.

11. The method of claim 5, further comprising receiving a value for the transmission channel loading over a communication network.

12. The method of claim 1, wherein adjusting the broadcast rate includes at least one of a minimum broadcast rate and a maximum broadcast rate.

13. The method of claim 1, wherein the broadcast rate is further adjusted based on rate of change of a velocity vector of the mobile unit.

14. The method of claim 1, where the messages are basic safety messages.

15. A mobile device for communicating messages at a broadcast rate comprising:
   a radio transceiver for receiving and broadcasting the messages over a wireless communication channel;
   a processor for receiving current speed of the mobile unit from the mobile unit and adjusting the broadcast rate of the messages based on the received current speed of the mobile unit, wherein the processor is configured to control the radio transceiver to continuously decrease the message broadcast rate as the speed of the mobile unit is reduced, and to continuously and linearly increase the message broadcast rate within minimum and maximum range as the speed of the mobile unit is increased.

16. The mobile device of claim 15, wherein the processor adjusts the broadcast rate of the messages such that the broadcast rate is linearly decreased when the speed of the mobile unit is reduced, and the broadcast rate is linearly increased when the speed of the mobile unit is increased.

17. The mobile device of claim 15, wherein the processor further determines prevailing conditions and adjusts the broadcast rate based on the prevailing conditions.

18. The mobile device of claim 17, wherein the processor determines the prevailing conditions based on at least one of states of one or more sensors local to the mobile unit and information provided from an external source over a communication system.

19. The mobile device of claim 15, wherein the processor further determines transmission channel loading and adjusts the broadcast rate based on the transmission channel loading.

20. The mobile device of claim 19, wherein the processor determines transmission channel loading based on number of messages received in a given time interval.

21. The mobile device of claim 19, wherein the processor determines transmission channel loading based on a value received from a stationary unit over a communication system.

* * * * *

UNITED STATES PATENT AND TRADEMARK OFFICE
CERTIFICATE OF CORRECTION

PATENT NO.        : 8,509,764 B2                                    Page 1 of 1
APPLICATION NO.   : 11/859978
DATED             : August 13, 2013
INVENTOR(S)       : Justin Paul McNew

It is certified that error appears in the above-identified patent and that said Letters Patent is hereby corrected as shown below:

On the Title Page
(73) Assignee                          Delete "Kapsch Trafficcom AG",
                                       Insert --Kapsch TrafficCom AG--

In the Claims
Column 6, line 21, Claim 1             Delete "and linearly"

Column 8, line 13, Claim 15            Delete "and linearly"

Signed and Sealed this
Twenty-sixth Day of November, 2013

Margaret A. Focarino
*Commissioner for Patents of the United States Patent and Trademark Office*